United States Patent
Allain-Grandvalet et al.

(10) Patent No.: US 11,127,404 B2
(45) Date of Patent: Sep. 21, 2021

(54) CAPPING THE RATE OF INCOMING TRANSACTIONS IN INBOUND STATEFUL CONVERSATIONS ESTABLISHED IN A DISTRIBUTED COMPUTING ENVIRONMENT

(71) Applicant: AMADEUS S.A.S., Biot (FR)

(72) Inventors: Aurelie Mahine Allain-Grandvalet, Antibes Juan les Pins (FR); Daniel Camille Bernard Levy, Biot (FR); Julien Delacroix, Valbonne (FR); Laurent Stacul, Courmes (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 15/930,956

(22) Filed: May 13, 2020

(65) Prior Publication Data
US 2020/0365156 A1 Nov. 19, 2020

(30) Foreign Application Priority Data
May 14, 2019 (FR) ...................................... 1905027

(51) Int. Cl.
*G10L 15/30* (2013.01)
*G10L 15/32* (2013.01)
*H04L 29/08* (2006.01)

(52) U.S. Cl.
CPC .............. *G10L 15/30* (2013.01); *G10L 15/32* (2013.01); *H04L 67/1008* (2013.01); *H04L 67/1012* (2013.01); *H04L 67/1031* (2013.01)

(58) Field of Classification Search
CPC ..... G10L 15/30; G10L 15/32; H04L 67/1012; H04L 67/1008; H04L 67/1031
See application file for complete search history.

(56) References Cited

U.S. PATENT DOCUMENTS

| | | | |
|---|---|---|---|
| 2008/0008095 A1* | 1/2008 | Gilfix | H04L 47/10 370/235 |
| 2008/0256256 A1 | 10/2008 | Acharya et al. | |
| 2010/0135155 A1* | 6/2010 | Sankhavaram | H04L 47/822 370/230 |
| 2014/0222997 A1* | 8/2014 | Mermoud | H04L 41/147 709/224 |
| 2016/0087915 A1* | 3/2016 | Marr | H04L 43/0882 709/226 |
| 2018/0241692 A1* | 8/2018 | Kumar | H04L 47/823 |
| 2019/0037026 A1 | 1/2019 | Brooks et al. | |

* cited by examiner

*Primary Examiner* — Stella L. Woo
(74) *Attorney, Agent, or Firm* — Perrier + Currier

(57) ABSTRACT

The present invention relates to a method and a system for capping incoming transactions in inbound stateful conversations established between a client and a plurality of conversation servers of a service integrator. For each client, a group of conversation servers is allocated to handle the inbound stateful conversations initiated. Each conversation server in the group broadcasts a local traffic value periodically to the other conversation servers in the group. Each conversation server in the group calculates a transaction capping limit based on a client global transaction capping limit and the broadcasted local traffic values from the other conversation servers in the group. Each conversation server limits the rate of incoming transactions received by the client when exceeding the local transaction capping limit.

13 Claims, 8 Drawing Sheets

CAPPING THE RATE OF INCOMING TRANSACTIONS IN INBOUND STATEFUL CONVERSATIONS ESTABLISHED IN A DISTRIBUTED COMPUTING ENVIRONMENT

CROSS-REFERENCE TO RELATED APPLICATIONS

This application claims priority from French patent application no. 1905027, filed May 14, 2019, the contents of which is incorporated herein by reference.

FIELD

The present invention relates a method and a system for capping the rate of transactions in stateful conversations established between at least one client and at least one software application running in a distributed computing environment.

BACKGROUND

Over the past few years, the distribution of services/applications through a cloud computing platform has become mainstream. The main advantage of cloud computing is that it abstracts most of the concerns relating to the physical hardware and/or software resources, thus enabling users to concentrate on their core business instead of focusing on the maintenance and deployment of data centres. The cloud computing model is based on providing a user with access to physical computing resources on a pay-as-you-go basis, whereby the user pays for the computing resources allocated to one or more application servers to run the required services/applications on the cloud computing platform. As the demand for the cloud operated services/applications changes, the underline physical resources can be dynamically scaled to meet the computing needs of the cloud services/applications at any given time.

In general, accessing a software application on a cloud computing platform requires the establishment of a conversation between at least one client and at least one application server. The conversation may be facilitated by means of a traffic management module, e.g. a Service Integrator (SI) or an Enterprise Service Bus (ESB), which may be responsible for processing the incoming client queries, message routing between the client and at least one application server, and many other lower-layer communication functions. The traffic management module allows for messages to be exchanged between at least one client and at least one application server in a series of transactions organised via a preferred communication protocol. The communication protocol used by the traffic management module may be of stateless or stateful nature. In a stateless protocol, the traffic management module is not required to retain session information or the status of each communicating party for the duration of the established conversation. Examples of stateless protocols may include the Internet Protocol (IP), which is the foundation for the Internet, and the Hypertext Transfer Protocol (HTTP), which is the foundation of data communication for the World Wide Web.

On the other hand, in a stateful protocol, the traffic management module is required to maintain all session information and the status of each communication party for the duration of the established conversation. In a stateful conversation, a plurality of conversation servers may be used to map inbound conversations, established between the client and the conversation servers using the client's protocol, to outbound conversations, established between the conversation servers and the at least one application, which may use a different communication protocol. Therefore, maintaining the mapping between inbound and outbound conversations necessitates the maintenance and storage of information pertaining to the interactions between the communicating parties for the duration of each conversation.

Although stateful conversations may be easily balanced between the conversation servers e.g. equally distributing the number of inbound conversations established by each client among the plurality of conversation servers, it may be extremely complex to balance the incoming transactions received for each stateful conversation among the plurality of servers. The rate of incoming transactions, also referred to as incoming traffic, for each stateful conversation is inhomogeneous, thus it is extremely difficult to anticipate accurately the amount of incoming traffic that will be generated in each inbound stateful conversation. As a result, some conversation servers may be required to handle more incoming transactions than other conversation servers, which may affect the stability of the traffic management module and impact the Quality of Service (QoS) expected by other clients, as defined in their Service Level Agreement (SLA). For example, a client engaged in a stateful conversation may overload the traffic management module with a large number of incoming transactions that surpass the levels agreed in their SLA, and thus affect the computing resources available by the traffic management module for handling incoming traffic from other clients.

SUMMARY

According to a first aspect of the present invention, a method for capping a rate of incoming transactions in inbound stateful conversations established between a client and a plurality of conversation servers of a service integrator may be provided. Each conversation server configured to map at least one inbound stateful conversation to at least one outbound stateful conversation, which is established between the conversation servers and at least one application server, the method comprising: allocating by means of a server allocation engine a group of conversation servers to handle the inbound stateful conversations established by the client, the group of conversation servers being selected from the plurality of conversation servers; and for each selected conversation server in the group, determining by means of a monitoring engine, a local incoming traffic value associated with the rate of incoming transactions handled by the selected conversation server; broadcasting by means of a broadcasting engine a local traffic value to each one of the other selected conversation servers in the group, the local traffic value being calculated based on the incoming local traffic value of the selected conversation server; computing by a limit computation engine a local transaction capping limit, based on a client global transaction capping limit and the broadcasted local traffic values received from the other selected conversation servers in the group, defining the maximum incoming transactions to be handled by the selected conversation server; and capping by means of a transaction capping engine, the rate of incoming transactions when exceeding the local transaction capping limit.

It has been found that capping the rate of incoming transactions using a local computed transaction capping limit at each conversation server may ensure the stability of the service integrator by preventing overloading of its computing resources. Each conversation server involved in stateful conversations initiated by a client independently calculates a local transaction capping limit, thus ensuring that stateful conversations with a rate of incoming transactions, exceeding the transaction capping limit, are throttled back to a predetermined threshold. The local transaction capping limit may define the maximum incoming transactions to be handled by the conversation server based on a client global transaction capping limit and broadcasted local traffic values from the other conversation servers. The present invention, takes into account the global behaviour of a client, in all initiated stateful conversations, and accordingly determines how best to cap the total incoming traffic generated by the client without impacting the expected QoS, which may have been defined in the client's SLA, and the QoS expected by other clients sharing the same computing resources. By providing a local transaction capping limit, it is possible to ensure that, as the incoming traffic generated by a client increases, the sum of all incoming transactions involved in all client's stateful conversations handled by a group of allocated conversations servers converges to a predefined global transaction capping limit. As a result, with the present method each client is provided with enough computing capacity to satisfy the QoS defined in the client's SLA while minimising the risk of the client overloading the computing resources of the service integrator. It should be noted that the present invention may be equally applied to an Enterprise Service Bus (ESB), or any other computing resource having similar functionality to that of the Service Integrator (SI).

According to embodiments, the local traffic value defines a minimal expected incoming traffic value calculated from the local incoming traffic value.

It has been found that by calculating the minimal expected traffic on each conversation server in the group it is possible to forecast the total traffic that would be generated by the client, which may be used to determine the number of conversation servers required in the group to service the client. For example, if the minimum expected traffic per server is below a certain value e.g. below 200 Transactions per second (TPS), it may be beneficial to reduce the number of conversation servers in the group and concentrate the inbound stateful conversations so that each conversation server received a desired volume of traffic. Furthermore, computing the local transaction capping limit based on the estimated minimal expected traffic that would be handled by each server in the group, may ensure that the local transaction capping limit is maintained at or above the minimum accepted traffic defined in the SLA.

According to embodiments, computing a local transaction capping limit on a given conversation server "s" comprises the steps of: calculating a first value representing a first local transaction capping limit obtained from $$\frac{ls}{L} \cdot G;$$

calculating a second value representing a second local transaction capping limit obtained from G−(L−ls); and selecting the higher of the first and second values as the local transaction capping limit; where for the client: ls representing for server "s" the minimal expected local incoming traffic value, $L=\Sigma_{i=1}^{n} li$, representing the sum of minimal expected traffic on all conversation servers in the group, G=Client global transaction capping limit.

It has been found that the above steps ensure with high probability that the total incoming traffic handled by all conversation servers, based on their local transaction capping limit, is equal to or above the client global transaction capping limit. As a result, the QoS expected by the client is maintained while preventing the client from overloading the computing resources of the service integrator. The first value may represent the global transaction limit for each client in proportion to the minimal expected local incoming traffic at each conversation server divided by the sum of minimal expected traffic on all conversation servers in the group. The second value may define the available capacity of the conversation servers in the group, which may be represented as missing traffic. By taking the highest value from the first and second values as the local transaction capping limit at each conversation server, it is ensured that the maximum number of incoming client requests that can be handled by all conversation server in a stateful conversation is maintained above the value defined by global transaction capping limit defined in the client's SLA.

According to embodiments, the minimal expected incoming traffic value is estimated from a 3-sigma lower bound analysis of the incoming traffic value of each conversation server in the group.

It has been found that by employing a 3-sigma lower-bound analysis of the local incoming traffic of each conversation server, it is ensured that the minimal expected incoming traffic is more accurately calculated. As a result, it is possible to more accurately predict the incoming traffic that would be handled by each selected conversation server and accordingly, if needed, adjust the number of conversation servers in the group. In this way, it is possible to dynamically adjust the number of conversation servers in the group so that on average each one handles a predetermined amount of incoming transactions.

According to embodiments, the step of computing the local transaction capping limit is triggered dynamically upon receiving a new local traffic value from at least one other conversation server in the group.

By computing the local transaction limit every time there is a change in the minimal expected incoming traffic of each conversation server in the group of conversation servers, it is ensured that the local transaction capping limit is dynamically adjusted according to the demand. As a result, as the demand for the service increases, the transaction capping, also may be referred to as throttling, for each client may become more aggressive. As the incoming traffic at each server increases, the accuracy of the 3-sigma lower bounds analysis becomes more accurate, thus enabling to determine a local transaction limit at each server that is close or equal to a predetermined threshold, e.g. the global transaction client limit indicated in the SLA.

According to embodiments, the step of computing the local transaction capping limit is triggered dynamically upon receiving notification about a conversation server state change.

The number of available conversation servers in the group may change for a number of reasons during the duration of the stateful conversations established by the client, e.g. a server is shut-down or paused. As a result, the local transaction capping limit would need to be recomputed each time there is a change in the state of a conversation server in the group. In this way, it is ensured that the local transaction capping limit of all available conversation servers in the group is maintained above the client global transaction capping limit, to maintain the QoS expected by the client.

According to embodiments, the local traffic value of each selected conversation server is broadcasted periodically to each of the other conversation servers in the group.

It has been found that by broadcasting the local traffic value of each conversation server in the group periodically, it increases the accuracy of the computed minimal expected incoming traffic. As a result, the local transaction capping limit at each conversation server may be more accurately adjusted to reflect the minimal expected incoming traffic determined for each conversation server in the group.

According to embodiments, the sum of the local transaction capping limits on all conversations servers in the group is equal to or higher than the client global transaction limit.

It has been found that when the sum of the local transaction capping limits on all conversation servers is equal to or higher than the client global transaction capping limit, the client experiences a Quality of Service (QoS) according to the SLA, while maintaining the rate of incoming transactions received by each client capped to a predetermined threshold, which may be equal or above the corresponding value in the client's SLA, thus ensuring that the QoS experienced by other clients is not affected.

According to embodiments, the step of capping the rate of transactions comprises checking whether the local capping limit of each conversation server in the group has been reached to determine whether a client transaction can be processed by the conversation servers in the group. For example, the step of capping may be performed using a token bucket algorithm.

It has been found that checking whether a conversation server has reached its local transaction capping limit, before forwarding an incoming transaction may ensure that the client is promptly notified that the limit has been reached and may help reduce the amount of traffic transmitted over the network.

According to embodiments, the step of allocating a group of conversation servers to handle the inbound stateful conversations established by the client comprises: establishing for each inbound stateful conversation at least one connection between the client and a plurality of multiplexers of the service integrator; selecting by means of the plurality of multiplexers a group of conversation servers from the plurality of conversation servers to handle the incoming transactions from all inbound stateful conversations established by the client; and distributing by a plurality of multiplexers, each corresponding inbound stateful conversations to selected conversation servers in the group.

It has been found that the use of multiplexers in routing inbound stateful conversation has the advantage that routing of incoming transactions to conversation servers can be adapted to changes experienced in the amount of incoming traffic handled by the selected conversation servers in the group. For example, the multiplexers may adjust the number of conversation servers in the group to accommodate changes detected in the minimal expected incoming traffic determined for each conversation server.

According to embodiments, the step of establishing at least one connection for each inbound stateful conversation comprises: receiving the connections at a load balancer module interposed between the client and the service integrator, and allocating said connections to the plurality of multiplexers such that the load is equally distributed.

According to embodiments, the step of selecting a group of conversation servers comprises a step of determining, based on the client global transaction limit, the number of conversation servers required in the group to handle the client's incoming transactions.

It has been found that by determining the number of conversation servers in the group based on the client global transaction limit may offer the advantage that the client would always receive the expected QoS, while preventing the overloading of conversation servers with incoming transactions, thus ensuring that the QoS of service expected by other clients would not be affected.

According to embodiments, the number of conversation servers in the group is dynamically adjusted using a hash-ring algorithm based on changes in the local traffic value determined for each conversation server.

The number of conversation servers in the group may be adjusted as the local traffic value of each conversation server changes over time. The number of conversation servers in the group may be adjusted such that each conversation server receives a predetermined amount of incoming traffic to ensure the accurate calculation of the minimal expected incoming traffic using the 3-sigma analysis, or another statistical method. For example, the number of conversation servers in the group may be adapted using a hash-ring algorithm, or another algorithm. For example, the hash-ring algorithm, may be used to concentrate stateful conversations on conversation servers in the group in case of low incoming traffic volumes such that each conversation server in the group receives at least a desired volume of incoming traffic, e.g. 200 transactions per seconds (TPS).

According to a second aspect of the present invention, a throttling engine may be provided for capping incoming transactions in inbound stateful conversations established between a client and a plurality of conversation servers of a Service Integrator (SI). Each conversation server is configured to map at least one inbound stateful conversation to at least one outbound stateful conversation, which is established between the conversation servers and at least one application server, the throttling engine comprising: a server allocation engine configured to allocate a group of conversation servers to handle the inbound stateful conversations established by the client, the group of conversation servers being selected from the plurality of conversation servers; and for each selected conversation server in the group a monitoring engine configured to determine a local incoming traffic value associated with the rate of incoming transactions handled by the selected conversation server; a broadcasting engine configured to broadcast a local traffic value to each one of the other selected conversation servers in the group, the local traffic value being calculated based on the incoming local traffic value of the selected conversation server; a limit computation engine configured to compute a local transaction capping limit, based on a client global transaction capping limit and the broadcasted local traffic values received from the other selected conversation servers in the group, defining the maximum incoming transactions to be handled by each conversation server; and a transaction capping engine configured to limit the rate of incoming transactions when exceeding the local transaction capping limit.

According to embodiments of the second aspect, the local traffic value defines a minimal expected incoming traffic value calculated from the local incoming traffic value.

According to embodiments of the second aspect, the limit computation engine is configured to calculate the local transaction capping limit on a given conversation server "s" by: calculating a first value representing a first local transaction capping limit obtained from ls/L·G; calculating a second value representing a second local transaction capping limit obtained from G−(L−ls); and selecting the higher of the first and second values as the local transaction capping limit; where for the client: ls representing for server "s" the minimal expected local incoming traffic value, $L=\Sigma_{i=1}^{n}$ li representing the sum of minimal expected traffic on all conversation servers in the group, G=Client global transaction capping limit.

According to embodiments of the present invention, the minimal expected incoming traffic value is calculated from a 3-sigma lower bound analysis of the incoming traffic value of each conversation server in the group According to embodiments of the second aspect, the limit computation engine is configured to dynamically compute the local transaction capping limit upon receiving a new local traffic value from at least one other conversation server in the group.

According to embodiments of the second aspect, the limit computation engine is configured to dynamically compute the local transaction capping limit upon receiving notification about a conversation server state change.

According to embodiments of the second aspect, the broadcasting module is configured to broadcast the local traffic value of each selected conversation server periodically to each of the other conversation servers in the group.

According to embodiments of the second aspect, the sum of the local transaction capping limits on all conversations servers in the group is equal to or higher than the client global transaction limit.

According to embodiments of the second aspect, the client global transaction limit is obtained at least partially from a client Service Level Agreement (SLA) and/or set by a user.

According to embodiments of the second aspect, the transaction capping engine is configured to check whether the local capping limit of each conversation server in the group has been reached so as to determine whether a client transaction can be processed by the conversation servers in the group.

According to embodiments of the second aspect, the transaction capping engine is configured to cap the rate of incoming transactions based on a token bucket algorithm.

According to embodiments of the second aspect, the server allocation engine is configured to allocate a group of conversation servers to handle the inbound stateful conversations established by the client by: establishing for each inbound stateful conversation at least one connection between the client and a plurality of multiplexers of the service integrator; selecting by means of the plurality of multiplexers a group of conversation servers from the plurality of conversation servers to handle the incoming transactions from all inbound stateful conversations established by the client; and distributing by a plurality of multiplexers, each corresponding inbound stateful conversations to selected conversation servers in the group.

According to embodiments of the second aspect, establishing at least one connection for each inbound stateful conversation is performed by: receiving the connections at a load balancer module interposed between the client and the service integrator, and allocating said connections to the plurality of multiplexers such that the load is equally distributed.

According to embodiments of the second aspect, the allocation engine is configured to determine, based on the client global transaction limit, the number of conversation servers required in the group to handle the client's incoming transactions.

According to embodiments of the second aspect, the server allocation engine is configured to dynamically adjust the number of conversation servers in the group using a hash-ring algorithm based on changes in the local traffic value of each conversation server.

BRIEF DESCRIPTIONS OF THE DRAWINGS

Embodiments are described with reference to the following figures, in which.

DETAILED DESCRIPTION

The present invention will be illustrated using the exemplified embodiments shown in FIGS. 1 to 8, which will be described in more detail below. It should be noted that any references made to dimensions are only indicative and do not restrict the invention in any way. While this invention has been shown and described with references to certain illustrated embodiments thereof, it will be understood by those skilled in the art that various changes in form and details may be made therein without departing from the scope of the invention. Furthermore, while the invention has been described with references to a particular system and/or a method for capping a rate of incoming transactions in inbound stateful conversations established between a client and a plurality of conversation servers of a service integrator, it should be understood by those skilled in the art that changes in the form and details may be made to facilitate other types of method and/or systems in related fields without departing from the scope of the invention.

Figure 1:
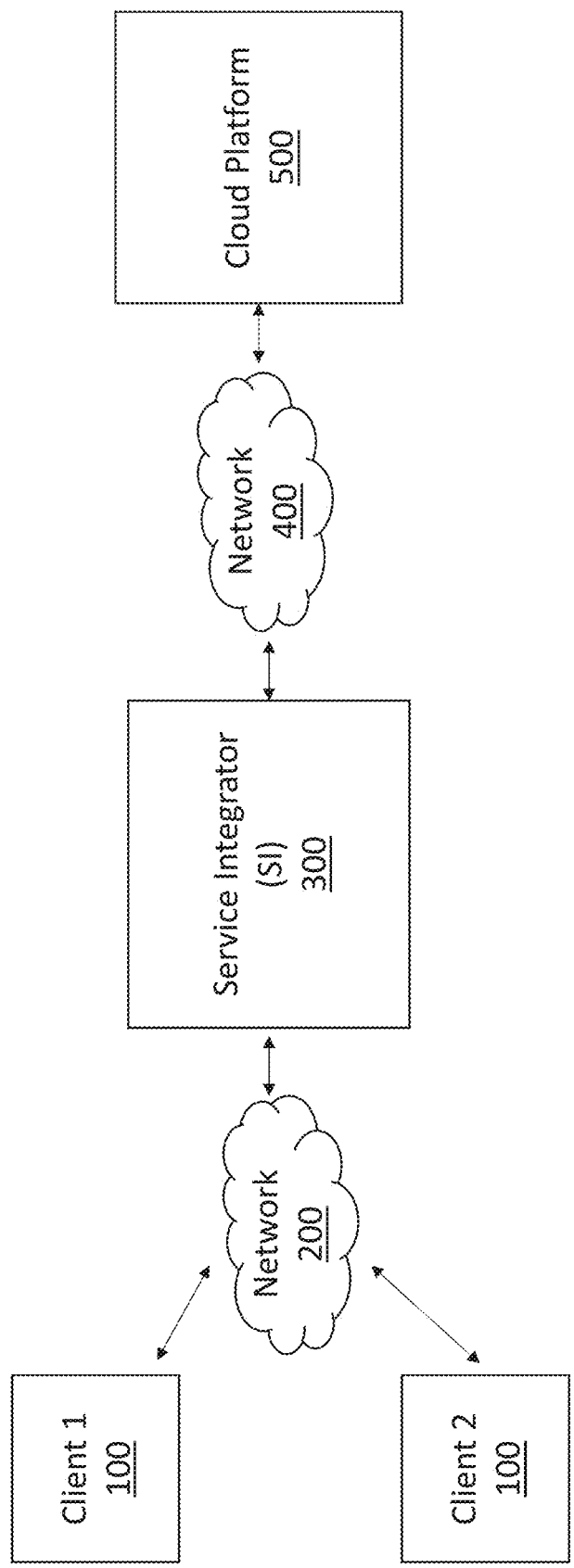
FIG. 1 shows an example of an architecture for connecting clients to cloud platforms via a service integrator according to embodiments of the present invention.

FIG. 1 shows an example of an architecture for allowing clients 100 to connect to at least one application server of a cloud platform 500 via a service integrator 300. The service integrator (SI) 300 is configured to receive inbound stateful conversations from clients via a communication network 200, which are then mapped to outbound conversations established between the SI 300 and at least one application server of the cloud platform 500, via a second communication network 400. In this way, clients 100 may exchange messages with an application server of a cloud platform 500 using a stateful protocol, which requires that the information pertaining to the communication between each client 100 and the at least one application server is maintained for the duration of the conversation. The inbound stateful conversations, may be established between each client 100 and the SI 300 using the client's protocol via the communication network 200, while the outbound conversations, may be established between the SI 300 and at least one application server of the cloud platform 500 via a second communication network 400, which may use a different communication protocol. Therefore, maintaining the mapping between inbound and outbound conversations necessitates the maintenance and storage of information pertaining to the interactions between the communicating parties for the duration of each conversation.

Figure 2:
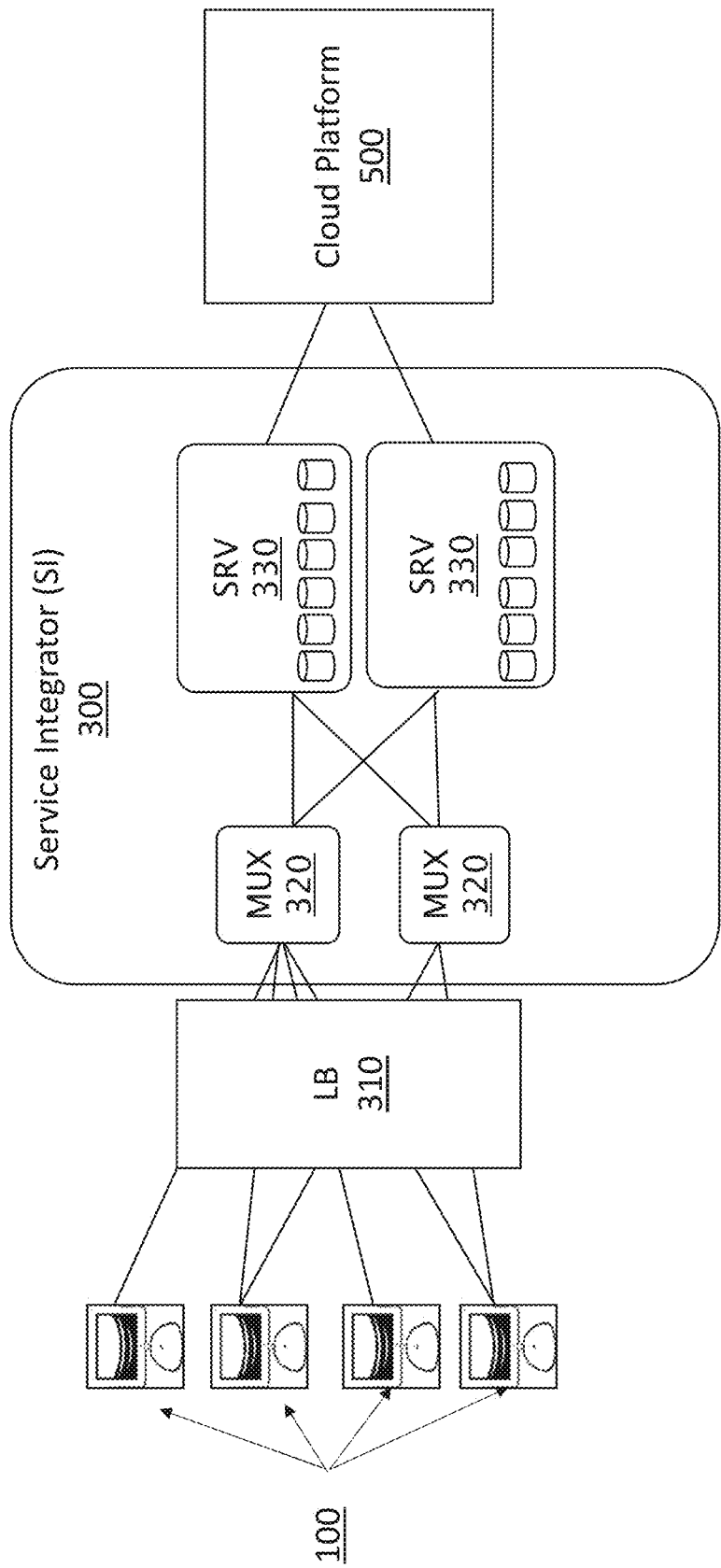
FIG. 2 shows an example of a service integrator according to embodiments of the present invention.
Figure 3:
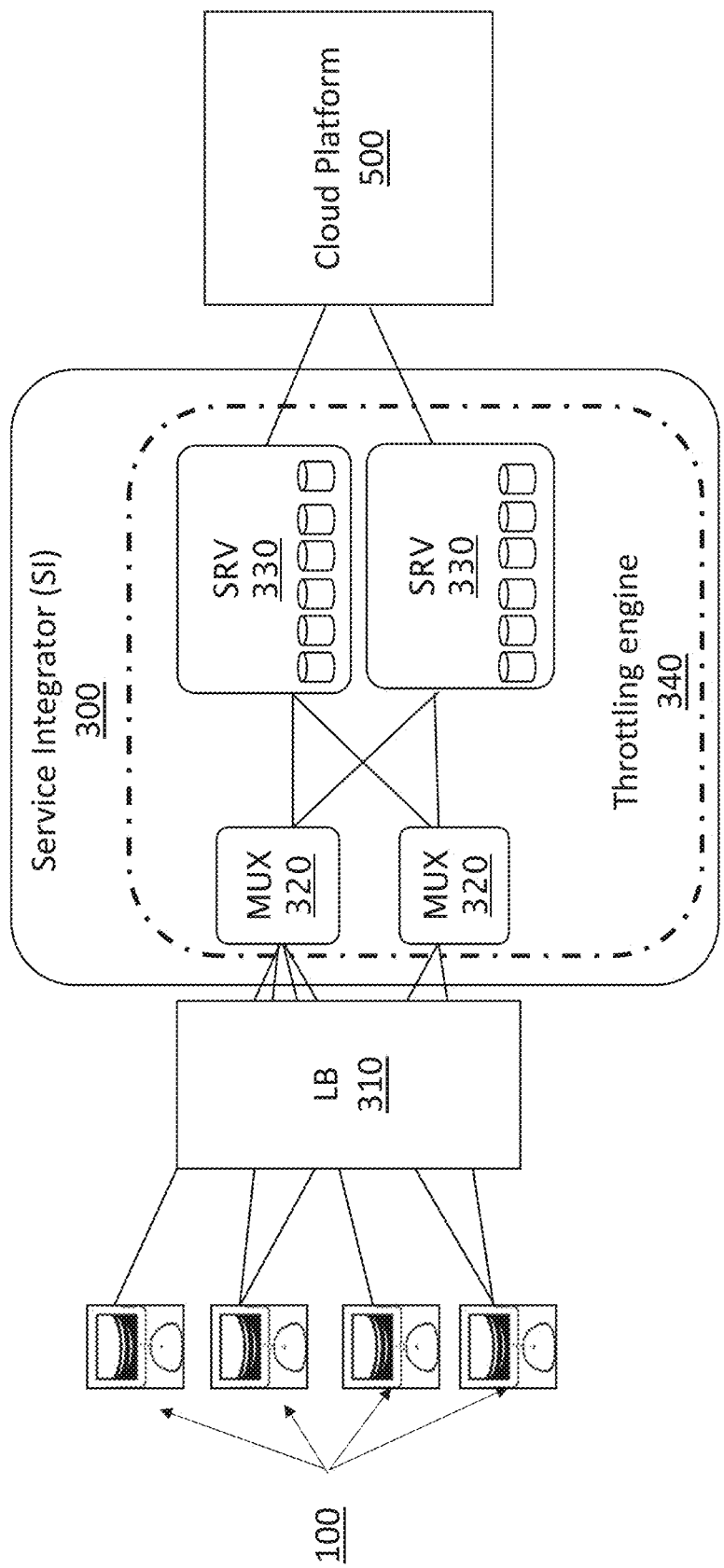
FIG. 3 shows an example of a service integrator according to embodiments of the present invention.

FIG. 2 shows an example of service integrator 300 according to embodiments of the present invention. A load balancer module (LB) 310 may be associated with the service integrator 300, interposed between the client and the service integrator 300. This load balancer module 310 may be configured to receive the clients' connections, and accordingly distribute said connections to a plurality of multiplexers 320 of the Service Integrator (SI) 300. The LB 310 may be configured to distribute the clients' connections such that the load is balanced among the SI multiplexers 320. The multiplexers 320 are configured to select a group of conversation servers 330 of the SI 300 to handle incoming transactions received via the connection established between each client 100 and the multiplexers 320. Each client 100 may open a number of stateful inbound conversations, each established between the client 100 and the group of conversation servers 330 of the SI 300. The multiplexers (SI MUX) 320 may be configured to balance the inbound stateful conversations on the different conversation servers (SI SRV) 330 in the group when receiving a message from the client 100 that starts a new conversation. The SI SRV 330 in the group selected for each client 100 may be configured to map the inbound stateful conversations into one or more outbound stateful conversations established between the SI SRV 330 and one or more application servers, to ensure the communication of messages between the client 100 and at least one application server of the cloud platform 500. Each inbound stateful conversation may comprise a plurality of incoming transactions, which may comprise a client request and a reply from the conversation servers 330. In order to ensure the number of total incoming transactions issued by each client in all open inbound stateful conversations does not impact the QoS of other clients or causes an overload of the SI computer resources, e.g. due to the use of a large number of conversations servers 330 required for handling the volume of incoming transactions, a throttling engine 340 may be provided, as shown in FIG. 3. The throttling engine 340 may be configured to cap or throttle back, the rate of incoming transactions in inbound stateful conversations according to a local transaction capping limit. The transaction capping limit is computed for each selected conversation server 330 in the group allocated to handle the incoming traffic from a client 100. Enforcing the local computed transaction capping limit on each conversation server may prevent overloading of the service integrator computing resources thus ensuring its stability, which is key for maintaining the QoS expected by each client 100. Each conversation server 330 involved in stateful conversations initiated by a client 100, may independently calculate a local transaction capping limit, thus ensuring that stateful conversations with a high rate of incoming transactions are throttled back to a predetermined threshold.

Figure 4:
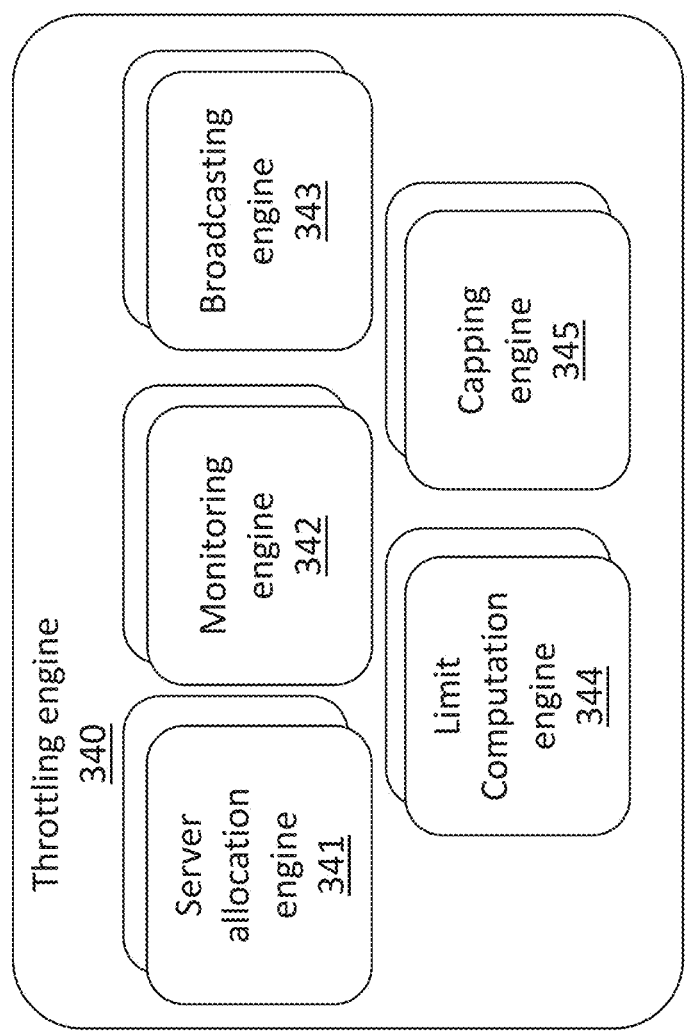
FIG. 4 shows an example of a throttling engine according to embodiments of the present invention.

FIG. 4 shows an example of a throttling engine 340 according to embodiments of the present invention. According to embodiments of the present invention each client is provided with a throttling engine to ensure the capping of inbound conversations according to the global transaction capping limit established for each client. Each throttling engine 340 may be provided with at least one server allocation engine 341, at least one monitoring engine 342, at least one broadcasting engine 343, at least one limit computation engine 344, and at least one capping engine 345. The components of the throttling engine may be distributed among the multiplexers 320 and conversation servers 330 of the SI 300, as shown in FIG. 3. For example, each multiplexer 320 may be provided with a server allocation engine 341, while each conversation server 330 may be provided with a monitoring engine 342, a broadcasting engine 343, and a limit computation engine 344. A different distribution of the throttling engine components in the SI 300 is also possible. Furthermore, the throttling engine 340 may be provided as a separate component, which may be part of the Service Integrator (SI) 300, and configured to communicate with the multiplexers 320 and the conversation servers 330. The server allocation engine 341 may be configured to select for a client a group of conversation servers 330 from the plurality of conversation servers 330 to handle the incoming transactions of inbound stateful conversations generated by the client. For example, the server allocation engine 341 may be configured to calculate for a client 100, based on this client global transaction limit, the number of conversation servers 330 required to handle the number of incoming transactions defined in this client SLA. The server allocation engine 341 may be configured to distribute the incoming traffic received from the client 100 to the selected conversation servers 330 in the group. The server allocation engine 341 may be configured to dynamically adjust the number of conversation servers 330 in the group based on changes in the average incoming traffic received from the client. For example, the server allocation engine 341 may increase or decrease the number of conversation servers 330 in the group based on local traffic value broadcasted by each selected conversation server 330. In the case of low volumes of incoming traffic e.g. below a certain threshold, the server allocation engine 341 may use a hash-ring algorithm to concentrate the stateful conversations of a client on a reduced number of conversation servers 330. For example, the server allocation engine 341 may be configured to use the hash-ring algorithm to concentrate stateful conversations such that each conversation server 330 in the group receives at least a desired volume of incoming traffic, e.g. 200 transactions per seconds (TPS). The monitoring module 342 may be configured to determine for each conversation server 330 in the group a local incoming traffic value associated with the rate of incoming transactions handled by each of the conversation servers 330 over a predetermined period. The broadcasting engine 343 may be configured to broadcast a local traffic value of each selected conversation server 330 to each one of the other selected conversation servers in the group. The local traffic value may be calculated based on the incoming local traffic value received from the monitoring module 342 of the selected conversation server. In this way, each conversation server 330 in the group is aware of the incoming traffic value handled by each of the conversation servers 330 in the group. The broadcasting engine 343 may broadcast the local traffic value of each server periodically. The limit computation engine 344 may be configured to compute at each conversation server 330, based on a client 100 global transaction capping limit and the broadcasted local traffic value received from the other selected conversation servers 330 in the group, a local transaction capping limit defining the maximum incoming transactions to be handled by the selected conversation server 330. For example, the limit computation engine 344 may calculate the local transaction capping limit on a given conversation server "s" by calculating a first transaction capping limit based on the ratio of the minimal expected local incoming traffic value on server "s" (Is) and the sum of the minimal expected traffic on all conversation servers 330 in the group (L), the ratio being multiplied by the client global transaction capping limit (G)

$$i.e.\ \frac{ls}{L} \cdot G.$$

To ensure accuracy and to maintain the capping limit at the same level or above the client global computation limit, the limit computation engine 344 may calculate a second local transaction capping value. The second local transaction capping value may be calculated as the difference between the client global transaction limit and the sum of the expected minimal incoming traffic in all conversation servers 330 minus the expected minimal incoming traffic on the given conversation server "s", i.e. G−(L−ls), which may be thought as the missing incoming traffic that must be accepted by the conversation serves 330 in the group to ensure that the SLA is not violated. In order to guarantee the QoS expected for the client, the limit computation engine 344 may select as a local transaction capping limit for the conversation server "s" the highest value from the first and second transaction capping values calculated previously, $$i.e.\ \frac{ls}{L} \cdot G,$$

G−(L−ls).

Figure 5:
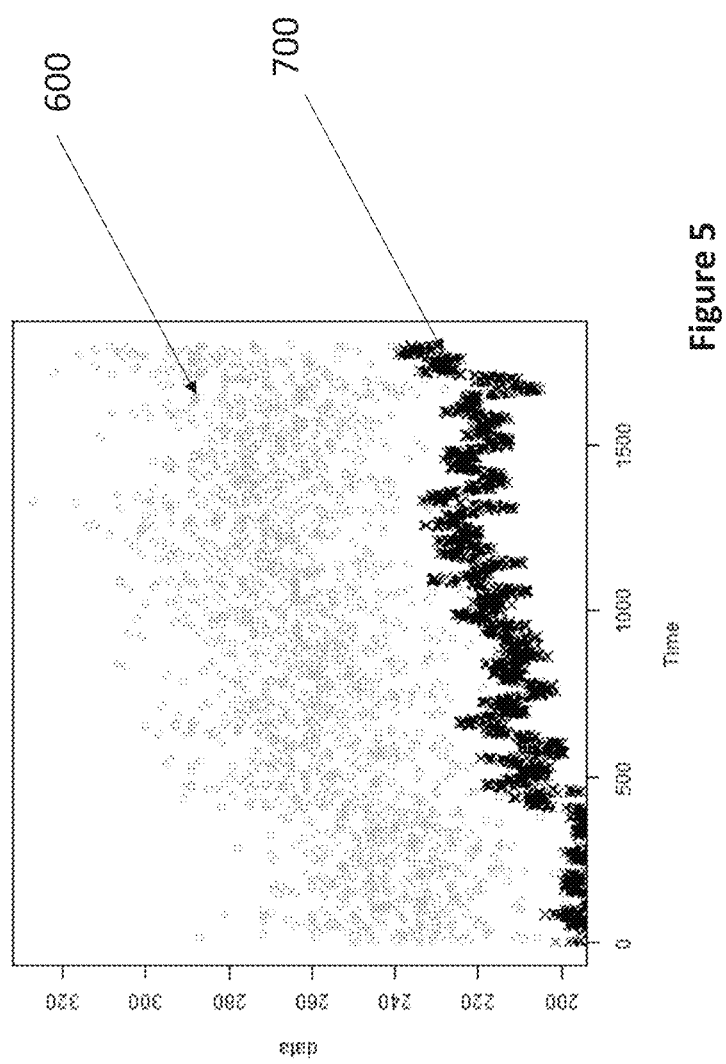
FIG. 5 shows an example of a 3-sigma lower limit of minimal expected incoming traffic calculation according to embodiments of the present invention.

The limit computation engine 344 may compute the local transaction capping limit in each conversation server 330 in the group following the same steps as for conversation server "s". The computation of the local transaction capping limit may be triggered upon receiving at the limit computation engine 344 a new local incoming traffic value from at least one other conversation server 330 in the group and/or upon a notification that the state of a conversation server 330 in the group has changed, e.g. conversation server paused, shut-down, and the like. The limit computation engine 344 may compute the minimal expected incoming traffic value using a 3-sigma lower bound analysis on the average incoming traffic in each conversation server. The 3-sigma analysis ensures that the minimal expected incoming traffic would be calculated with high accuracy, thus allowing a more accurate calculation of the local transaction capping limit on each conversation server. In this way, the capping, also referred to as throttling, of the incoming transactions of a client may be triggered only when the transaction capping limit has been exceeded. An example of how the minimal expected incoming traffic calculation using the 3-sigma analysis compares to the actual incoming traffic is shown in FIG. 5. As shown, the minimal expected traffic 700 forecasted at each conversation server 330 over the duration of a conversation is lower than the actual incoming traffic. As a result, the sum of the transaction capping limits calculated for the conversation servers 330 would be higher than the global client transaction limit. In this way, the QoS expected by the client is maintained while preventing clients from overloading the computing resources of the SI 300. The accuracy of the 3-sigma analysis increases as the volume of incoming traffic increases as shown in the example of the table below:

Table 1 below, shows an example of a 3-sigma lower bound analysis for calculating minimal expected incoming traffic, with traffic modelled as a Poisson process:

TABLE 1

3-sigma lower bound analysis for calculating minimal expected incoming traffic, with traffic modelled as a Poisson process

| Average incoming traffic on each conversation server in Transactions Per Second (TPS) | Minimal expected incoming traffic 3-sigma lower bound) on each conversation server in Transactions Per Second TPS |
|---|---|
| 10 | $10 - 3\sqrt{10} \approx 0$ |
| 100 | $100 - 3\sqrt{100} \approx 70$ |
| 1000 | $1000 - 3\sqrt{1000} \approx 905$ |

From the table above, it can be observed that as the average incoming traffic increases, the calculated minimal expected incoming traffic comes closer to the actual level of incoming traffic handled by each conversation server 330. Based on the above, the server allocation engine 341 may decide, when the average incoming traffic is low, to group inbound conversations, such that the incoming traffic received at each conversation server 330 is high enough that a meaningful 3-sigma analysis can be carried out by the limit computation engine 344 to determine with high confidence the minimal expected incoming traffic value for each conversation server 330. The transaction capping engine 345 may be configured to limit the rate of incoming transactions at each conversation server 330 when the incoming traffic received exceeds the local transaction capping limit. In this way, a client is prevented from overloading the conversation servers 330 of the SI 300, which may impact the stability of the SI 300 and the QoS of other clients 100. The transaction capping engine 345 may be configured to check whether the local capping limit of each conversation server in the group has been reached to determine whether a client transaction can be processed by the conversation servers 330 in the group. The capping engine 345 may cap, or throttle back, the incoming transactions using a token bucket algorithm, which is continuously updated every time a new local transaction capping limit is calculated. As a result, the level of throttling can be adjusted as the volume of incoming traffic changes over time. For example, when the incoming traffic increases, the capping may become more severe.

Figure 6:
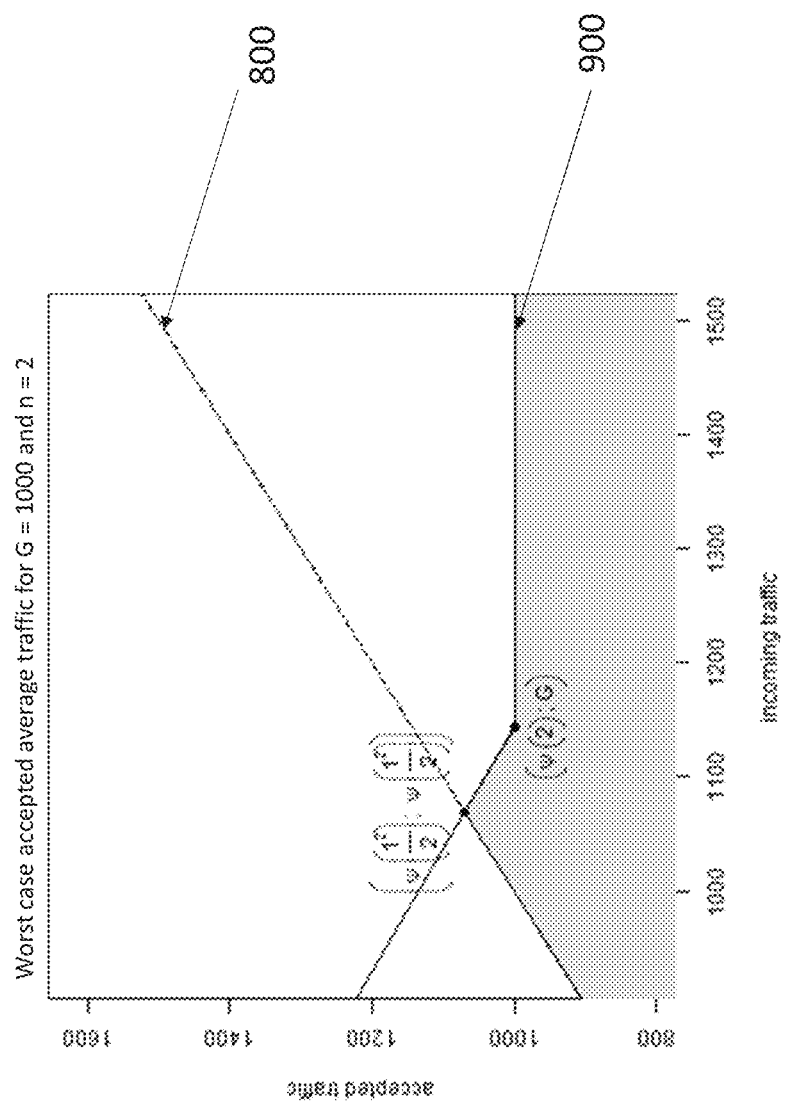
FIG. 6 shows an example of how the number of servers (n) for a given global transaction limit (G) in the worst case, where the incoming traffic is equally split among the conversation servers, affects the capping of incoming traffic.
Figure 7:
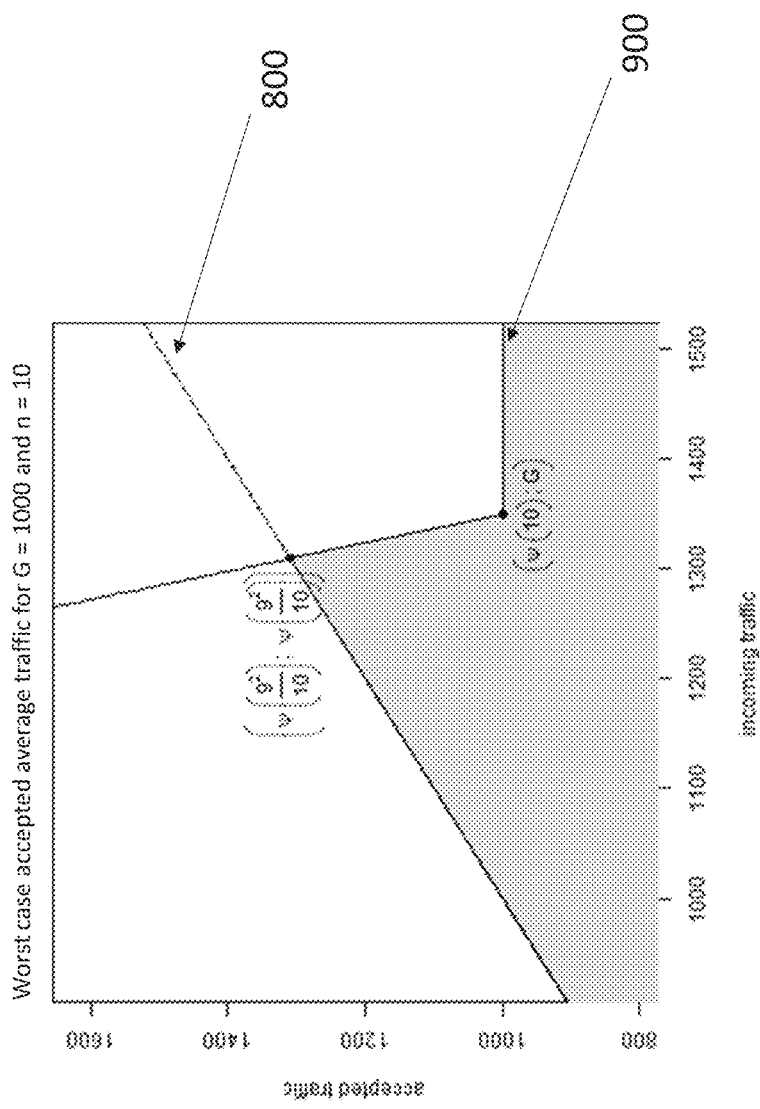
FIG. 7 shows an example of how the number of servers (n) for a given global transaction limit (G) in the worst case, where the incoming traffic is equally split among the conversation servers, affects the capping of incoming traffic.

FIGS. 6 and 7 show examples of different transaction capping scenarios using the capping method and throttling engine of the present invention. FIG. 6 shows an example where the client global transaction limit (G) is equal to 1000 transactions per second (TPS) and the number (n) of conversation servers 330 in the group is equal to two. The global transaction limit (G) defines the maximum accepted traffic 900 that can be handled by the two conversation servers 330 in the group. In the scenario shown in FIG. 6 the client total incoming traffic 800 is equally divided between the two conversation servers 330 in the group. Each conversation server 330 in the group is configured to handle approximately 500 TPS e.g. G/n=1000/2=500 TPS. In this case, which may be considered as the worst-case scenario, the capping of the client incoming traffic 800 would start when the accepted traffic 900 exceeds 1100 TPS rather at the global transaction limit of 1000 TPS. As the client incoming traffic 800 increases, the capping becomes more aggressive until the accepted traffic 900 is equal or close to the global transaction capping limit of 1000 TPS. The accepted traffic 900 defines the maximum amount of incoming traffic that is allowed to be processed by the group of conversation servers 330, and is equal to the sum of local transaction capping limits calculated at each conversation server 330 based on the minimal expected incoming traffic, as previously defined. The reason for the delay in capping the client incoming transactions 800 may be associated with the use of a statistical method e.g. 3-sigma lower bounds analysis, to forecast the minimal expected incoming traffic at each conversation server 330, as described above. In order to forecast with high confidence, the minimal expected incoming traffic value of each conversation server 330, the statistical method used requires a predetermined volume of incoming traffic. For example, as shown in table 1 above, the higher the average incoming traffic at each conversation server 330, the closer the forecasted minimal expected incoming traffic is to the actual value using the 3-sigma lower bounds analysis. Therefore, in the case presented in FIG. 6, an incoming traffic of approximately 1100 TPS was needed to calculate with high confidence the minimal expected traffic of each conversation server 330 in the group, thus ensuring that the accepted traffic 900 is throttled back to a value which is equal to or closely above the global transaction capping limit of 1000 TPS. FIG. 7 presents a similar scenario using the same global transaction limit of 1000 TPS but with ten conversation servers 330 in the group, each configured to handle approximately 100 TPS e.g. G/n=1000/10=100 TPS. In the case shown in FIG. 7, the delay in capping the client total incoming traffic 800 would be greater because of the number of conversation servers i.e. ten conversation servers 330 compared with two for FIG. 6. As a result of the lower volume of client incoming traffic handled by each conversation server 330 in the group, the capping would be triggered when the accepted traffic exceeds 1300 TPS, and would become more aggressive as the client incoming traffic 800 increases until the accepted traffic 900 converges to the global transaction capping limit of 1000 TPS. As we can observe, the volume of incoming traffic handled by each conversation server 330 in the group for a specified client global transaction limit may have an impact on the amount of incoming traffic required to trigger the capping process with high confidence. Therefore, in order to increase the volume of incoming traffic handled by each conversation server 330 in the group, it may be necessary to adjust the number of conversation servers 330 in the group e.g. by decreasing the number of conversation servers so that each conversation server handles more incoming traffic.

Figure 8:
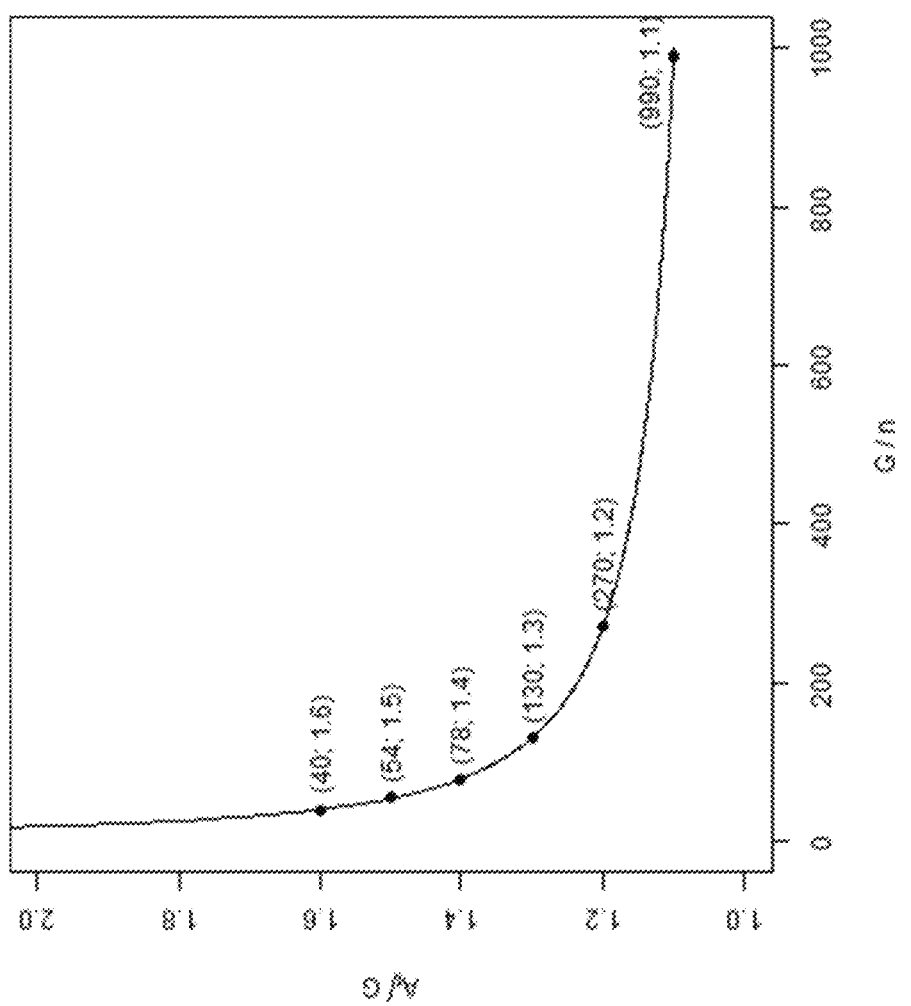
FIG. 8 shows an example of how the capping accuracy depends on the ratio between the global transaction limit and the number of servers.

Therefore, in each case it may be important to identify the optimum number of conversation servers 330 in the group that would yield the best results. FIG. 8 provides an analysis showing how the amount of incoming traffic accepted on each conversation server 330 in the worst case scenario e.g. whereby the client incoming traffic is equally divided among the conversation servers, impacts the volume of incoming traffic required for the accepted traffic to be throttled back to the client global transaction limit, which requires the calculation of the minimal expected traffic e.g. using the 3-sigma lower bound analysis as shown in table 1. G/n is the ratio between the global transaction capping limit 'G' e.g. 1000 TPS, and the number of servers 'n', and Af/G is the ratio between the incoming traffic volume which is necessary for the accepted traffic to be equal to the global limit 'G'. The analysis indicates that for values of accepted traffic at each conversation server 330 in the group of below 200 TPS, the value of Af/G increases exponentially e.g. for 130 TPS the Af/G=1.3 while for 54 TPS the Af/G=1.5. The analysis further shows that for values above 200 TPS the ratio Af/G decreases at a slower pace e.g. for 270 TPS the Af/G=1.2, while for 990 TPS the AfG=1.1. As previously discussed, as the volume of incoming traffic received at each conversation server increases the more accurate the computation of the local transaction capping limit for each server would become e.g. using the 3 sigma lower bound analysis shown in table 1. However, after a certain point e.g. around 200 TPS, the improvements in Af/G slow down considerably. Therefore, it may be considered that a value of accepted traffic for each server of around 200 TPS may offer the best results.

Based on the analysis shown in FIG. 8, the server allocation engine 341 may be configured to group inbound conversations so that each conversation server 330 in the group receives an adequate amount of incoming traffic e.g. of around 200 TPS.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. The computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using the computer readable storage medium having the computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other robust state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general-purpose computer, particular purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "With", "comprised of", or variants thereof are used, such terms are intended to be inclusive in a manner similar to the term "comprising".

While a description of various embodiments has illustrated all of the inventions and while these embodiments have been described in considerable detail, it is not the intention of the Applicants to restrict or in any way limit the scope to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the Applicants general inventive concept.

The invention claimed is:

1. A method for capping a rate of incoming transactions in inbound stateful conversations established between a client and a plurality of conversation servers of a service integrator, each conversation server configured to map at least one inbound stateful conversation to at least one outbound stateful conversation, which is established between the conversation servers and at least one application server, the method comprising:
    allocating by means of a server allocation engine a group of conversation servers to handle the inbound stateful conversations established by the client, the group of conversation servers being selected from the plurality of conversation servers; and
    for each selected conversation server in the group
        determining by means of a monitoring engine, a local incoming traffic value associated with the rate of incoming transactions handled by the selected conversation server;
        broadcasting by means of a broadcasting engine a local traffic value to each one of the other selected conversation servers in the group, the local traffic value defining a minimal expected incoming traffic value calculated from a 3-sigma lower bound analysis of the local incoming traffic value of the selected conversation server;
        computing by a limit computation engine a local transaction capping limit, based on a client global transaction capping limit and the broadcasted local traffic values received from the other selected conversation servers in the group, defining the maximum incoming transactions to be handled by the selected conversation server; and
        capping by means of a transaction capping engine, the rate of incoming transactions when exceeding the local transaction capping limit.

2. The method according to claim 1, wherein the step of computing a local transaction capping limit on a given conversation server "s" comprises:
    calculating a first value representing a first local transaction capping limit obtained from $$\frac{ls}{L} \cdot G;$$

calculating a second value representing a second local transaction capping limit obtained from G−(L−ls); and
    selecting the higher of the first and second values as the local transaction capping limit;
    where for the client:
        ls representing for server "s" the minimal expected local incoming traffic value, $L=\Sigma_{i=1}^{n} li$, representing the sum of minimal expected traffic on all conversation servers in the group,
        G=Client global transaction capping limit.

3. The method according to claim 1, wherein the step of computing the local transaction capping limit is triggered dynamically upon receiving a new local traffic value from at least one other conversation server in the group.

4. The method according to claim 1, wherein the step of computing the local transaction capping limit is triggered dynamically upon receiving notification about a conversation server state change.

5. The method according to claim 1, wherein the local traffic value of each selected conversation server is broadcasted periodically to each of the other conversation servers in the group.

6. The method according to claim 1, wherein the sum of the local transaction capping limits on all conversations servers in the group is equal to or higher than the client global transaction limit.

7. The method according to claim 1, wherein the step of capping the rate of transactions comprises checking whether the local capping limit of each conversation server in the group has been reached so as to determine whether a client transaction can be processed by the conversation servers in the group.

8. The method according to claim 7, wherein the step of capping the rate of incoming transactions is performed using a token bucket algorithm.

9. The method according to claim 1, wherein the step of allocating a group of conversation servers to handle the inbound stateful conversations established by the client comprises:
    establishing for each inbound stateful conversation at least one connection between the client and a plurality of multiplexers of the service integrator;
    selecting by means of the plurality of multiplexers a group of conversation servers from the plurality of conversation servers to handle the incoming transactions from all inbound stateful conversations established by the client; and distributing by a plurality of multiplexers, each corresponding inbound stateful conversations to selected conversation servers in the group.

10. The method according to claim 9, wherein the step of establishing at least one connection for each inbound stateful conversation comprises:

receiving the connections at a load balancer module interposed between the client and the service integrator, and allocating said connections to the plurality of multiplexers such that the load is equally distributed.

11. The method according to claim 9, wherein the step of selecting a group of conversation servers comprises a step of determining, based on at least the client global transaction limit, the number of conversation servers required to handle the inbound stateful conversations established by the client.

12. The method according to claim 11, wherein the number of conversation servers in the group is dynamically adjusted using a hash-ring algorithm based on changes in the local traffic value of each conversation server.

13. A throttling engine for capping incoming transactions in inbound stateful conversations established between a client and a plurality of conversation servers of a service integrator, each conversation server configured to map at least one inbound stateful conversation to at least one outbound stateful conversation, which is established between the conversation servers and at least one application server, the throttling engine comprising:

a server allocation engine configured to allocate a group of conversation servers to handle the inbound stateful conversations established by the client, the group of conversation servers being selected from the plurality of conversation servers; and for each selected conversation server in the group a monitoring engine configured to determine a local incoming traffic value associated with the rate of incoming transactions handled by the selected conversation server;

a broadcasting engine configured to broadcast a local traffic value to each one of the other selected conversation servers in the group, the local traffic value defining a minimal expected incoming traffic value calculated from a 3-sigma lower bound analysis of the local incoming traffic value of the selected conversation server;

a limit computation engine configured to compute a local transaction capping limit, based on a client global transaction capping limit and the broadcasted local traffic values received from the other selected conversation servers in the group, defining the maximum incoming transactions to be handled by each conversation server; and a transaction capping engine configured to limit the rate of incoming transactions when exceeding the local transaction capping limit.

\* \* \* \* \*